(12) United States Patent
Bolt

(10) Patent No.: US 8,839,275 B1
(45) Date of Patent: Sep. 16, 2014

(54) METHOD FOR INTERCEPTING INPUT/OUTPUT REQUESTS AND RESPONSES

(75) Inventor: Thomas B. Bolt, San Diego, CA (US)

(73) Assignee: Proximal Data, Inc., San Diego, CA (US)

( * ) Notice: Subject to any disclaimer, the term of this patent is extended or adjusted under 35 U.S.C. 154(b) by 181 days.

(21) Appl. No.: 13/489,428

(22) Filed: Jun. 5, 2012

Related U.S. Application Data

(60) Provisional application No. 61/493,975, filed on Jun. 6, 2011, provisional application No. 61/494,884, filed on Jun. 8, 2011.

(51) Int. Cl.
*G06F 3/00* (2006.01)
*G06F 9/46* (2006.01)
*G06F 13/00* (2006.01)

(52) U.S. Cl.
USPC ............................ 719/321; 719/313; 719/318

(58) Field of Classification Search
None
See application file for complete search history.

(56) References Cited

U.S. PATENT DOCUMENTS

| | | |
|---|---|---|
| 5,481,691 A | 1/1996 | Day, III et al. |
| 5,673,394 A | 9/1997 | Fenwick et al. |
| 5,765,181 A | 6/1998 | Oberlin et al. |
| 5,983,324 A | 11/1999 | Ukai et al. |
| 5,996,088 A | 11/1999 | Frank et al. |
| 6,000,006 A | 12/1999 | Bruce et al. |
| 6,567,904 B1 | 5/2003 | Khandekar et al. |
| 6,760,815 B1 | 7/2004 | Traversat et al. |
| 6,941,425 B2 | 9/2005 | Osborne |
| 7,047,387 B2 | 5/2006 | Goodsell |
| 7,117,306 B2 | 10/2006 | Rudelic |
| 7,356,651 B2 | 4/2008 | Liu et al. |
| 7,406,473 B1 | 7/2008 | Brassow et al. |
| 7,428,636 B1 | 9/2008 | Waldspurger et al. |
| 7,469,321 B2 | 12/2008 | Heller, Jr. |
| 7,484,073 B2 | 1/2009 | Cohen et al. |
| 7,509,460 B2 | 3/2009 | Zeffer et al. |
| 7,512,769 B1 | 3/2009 | Lowell et al. |
| 7,543,109 B1 | 6/2009 | Bell, Jr. et al. |
| 7,620,784 B2 | 11/2009 | Panabaker |
| 7,657,701 B2 | 2/2010 | Shanmuganathan |
| 7,657,706 B2 | 2/2010 | Iyer et al. |
| 7,660,953 B2 | 2/2010 | Ohran |
| 7,702,857 B2 | 4/2010 | Gill et al. |
| 7,734,820 B1 | 6/2010 | Ranade et al. |
| 7,783,839 B2 | 8/2010 | Gill et al. |
| 7,814,276 B2 | 10/2010 | Lin et al. |

(Continued)

FOREIGN PATENT DOCUMENTS

CN 101236530 A 8/2008

OTHER PUBLICATIONS

Sorav Bansal et al., "CAR: Clock with Adaptive Replacement", Stanford University, IBM Almaden Research Center.

(Continued)

*Primary Examiner* — Craig Dorais
(74) *Attorney, Agent, or Firm* — Clause Eight IPS; Michael Catania

(57) ABSTRACT

A method and system for intercepting I/O requests and responses in a proprietary operating environment or hypervisor-virtualization utilizing open source software or general public license device drivers. The processing includes at the added functionality module comprises at least one of encrypting, de-duplicating, compressing and caching.

2 Claims, 4 Drawing Sheets

(56) References Cited

U.S. PATENT DOCUMENTS

| | | | |
|---|---|---|---|
| 7,853,960 B1 | 12/2010 | Agesen et al. | |
| 7,856,530 B1 | 12/2010 | Mu | |
| 7,890,754 B2 | 2/2011 | Waldspurger et al. | |
| 7,945,761 B2 | 5/2011 | Subrahmanyam et al. | |
| 7,954,150 B2 | 5/2011 | Croft et al. | |
| 7,975,109 B2 | 7/2011 | McWilliams et al. | |
| 8,386,749 B2 | 2/2013 | Dannowski et al. | |
| 8,407,182 B1* | 3/2013 | Rajaa et al. | 707/610 |
| 2005/0125513 A1 | 6/2005 | Sin-Ling Lam et al. | |
| 2005/0232192 A1 | 10/2005 | Rawson, III | |
| 2007/0022417 A1* | 1/2007 | Holloway et al. | 717/162 |
| 2008/0005529 A1 | 1/2008 | Morris | |
| 2008/0168479 A1* | 7/2008 | Purtell et al. | 719/328 |
| 2009/0216910 A1 | 8/2009 | Duchesneau | |
| 2009/0288105 A1* | 11/2009 | Wookey | 719/328 |
| 2010/0191929 A1 | 7/2010 | Rawson, III | |
| 2010/0299667 A1 | 11/2010 | Ahmad et al. | |
| 2010/0332786 A1 | 12/2010 | Grohoski et al. | |
| 2011/0010502 A1 | 1/2011 | Wang et al. | |
| 2011/0069725 A1 | 3/2011 | Shkunov et al. | |
| 2011/0119669 A1 | 5/2011 | McRae | |
| 2011/0208900 A1 | 8/2011 | Schuette et al. | |
| 2012/0017049 A1 | 1/2012 | Hass | |
| 2012/0023077 A1 | 1/2012 | Kann et al. | |
| 2012/0054445 A1 | 3/2012 | Swart et al. | |
| 2012/0054447 A1 | 3/2012 | Swart et al. | |
| 2012/0066483 A1 | 3/2012 | Boury et al. | |
| 2012/0072576 A1 | 3/2012 | Yumerefendi et al. | |
| 2012/0072691 A1 | 3/2012 | Kawamura | |
| 2012/0079072 A1 | 3/2012 | Serenyi et al. | |
| 2012/0096473 A1 | 4/2012 | Durham et al. | |
| 2012/0124294 A1 | 5/2012 | Atkisson et al. | |
| 2013/0013877 A1 | 1/2013 | Tian | |

OTHER PUBLICATIONS

Peter Desnoyers, "Analytic Modeling of SSD Write Performance", SYSTOR '12 Proceedings of the 5th Annual International Systems and Storage Conference, Jun. 2012, Article No. 12; ACM.

Ismail Ari et al, "ACME: Adaptive Caching Using Multiple Experts", Proceedings of the 2002 Workshop on Distributed Data and Structures (WDAS 2002). Mar. 2002.

* cited by examiner

METHOD FOR INTERCEPTING INPUT/OUTPUT REQUESTS AND RESPONSES

CROSS REFERENCES TO RELATED APPLICATIONS

The Present Application claims priority to U.S. Provisional Patent Application No. 61/493,975, filed on Jun. 6, 2011, and U.S. Provisional Patent Application No. 61/494,884, filed on Jun. 8, 2011, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to a method for intercepting input/output requests and responses in a proprietary operating environment or virtualization hypervisor utilizing open source or GNU Public License device drivers.

2. Description of the Related Art

Proprietary operating environments and virtualization hypervisors may not provide mechanisms to intercept input/output ("I/O") requests for the purposes of adding functionality to or processing of the data in the I/O stream. It is highly advantageous for proprietary operating environments and virtualization hypervisors to utilize open source or Gnu Public License (GPL) device drivers.

The producers of proprietary operating systems, execution environments, and virtualization hypervisors often are reluctant to allow other companies to modify or add functionality within their core intellectual property and do not provide published/supported mechanisms to do so. It is desirable for independent software and hardware companies to add unique value to the I/O streams of these closed/proprietary environments in a manner that is minimally intrusive such that it introduces minimal chance for destabilization of the proprietary system, introduces minimal change to the closed/proprietary environment, and does not rely upon unpublished, proprietary, or likely to change mechanisms.

There are two primary prior art approaches that are commonly used to provide additional functionality to the I/O stream of a proprietary operating system. The first approach commonly used is development of specific device drivers for the proprietary system. In the case of common functionality that is to be added across all devices, all device drivers must be developed/modified to provide the desired functionality. This may be practical if the proprietary environment provides a driver development API or utilizes open source or GPL device drivers and there is a fixed small set of drivers affected. The second approach commonly used is reverse engineering and/or patching of the proprietary environment or device drivers. This approach is highly undesirable for technical (and in some cases legal) reasons. This approach is very prone to fail with new releases/version/patches/updates to the proprietary environment.

Computing environments often are very heterogeneous and contain hardware from many different manufacturers. This presents a considerable development and support burden for the developers and system administrators of operating systems, execution environments, and hypervisor-virtualization. The utilization of open source and GPL device drivers allows the producers of proprietary operating systems, execution environments, and virtualization hypervisors to avoid developing their own device drivers to support many types of hardware which their products will run on or are connect to.

In order to utilize open source or GPL device drivers, the proprietary environment is forced to freely provide source code of any modifications they make to the device drivers. The proprietary environment must also not statically link in the device drivers (otherwise they would be required to provide source code to their entire system), and finally must introduce a compatibility library that provides an interface between the proprietary system and the open source/GPL drivers that supplies all the supporting functionality required by the open source/GPL device drivers. Since this compatibility library contains portions of open source/GPL source code necessary to provide the required supporting functionality, it too must by dynamically linked and the source code for the compatibility library must be freely published.

The following definitions are used herein.

Hypervisor is a hardware virtualization technique that allows a computer to host multiple operating systems by providing a guest operating system with a virtual operating platform.

GNU, General Public License is a license for an open source operating system based on UNIX, which requires that derived works be distributed under the same license terms.

Kernel is a component of an operating system that connects a computer's software applications to the computer's hardware.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Virtual Machine is a software abstraction of a physical computer.

Device driver is a software program that allows a hardware device to interact with software installed on the hardware device.

Function pointer is a programming language data type that invokes a function in a computer memory.

Virtualization allows a person to operate multiple virtual machines (computers) on a single physical machine (computer).

Compatibility library is a software program that provides an interface between computer programs, and in particular an interface that provides an interface between a proprietary environment and an open source or GNU GPL device driver that provides the supporting functionality for the device driver.

BRIEF SUMMARY OF THE INVENTION

The Present Invention is preferably a method to intercept all I/O requests and responses of these proprietary environments or hypervisors utilize open source or GNU Public License (GPL) device drivers. This mechanism allows additional functionality to be added to the I/O processing of a closed/proprietary system.

The Present Invention is preferably a method for making a modification to the published source code of a required compatibility library to allow all I/O requests and responses to be intercepted and optionally processed by an independently developed dynamically linked module. Since the additional functionality is contained in a dynamically linked module, it may be open source, GPL, or proprietary to an independent software producer.

The primary purpose of the present invention is to allow additional functionality to be added to the I/O processing of closed/proprietary operating environments and hypervisor-virtualization if they utilize open source or GPL device drivers. Examples of such additional functionality include, but are not limited to encryption, de-duplication, compression and caching.

One aspect of the present invention is a method for intercepting I/O requests and responses in a proprietary operating environment or virtualization hypervisor utilizing open source software or GPL device drivers. The method includes identifying an I/O stream between a proprietary environment and a device driver, wherein the I/O stream is an I/O request or an I/O response, and wherein the device driver is an open source software device driver or a GPL device driver. The method also includes intercepting the I/O stream at a point of a compatibility library, wherein the point is selected from a point at which a context is established for calling the device driver and a point at which an I/O completion from the device driver is forwarded to the compatibility library. The method also includes transmitting the I/O stream to an added functionality module for processing. The method also includes processing the I/O stream at the added functionality module to create a processed I/O stream. The method also includes transmitting the processed I/O stream to either the device driver or the proprietary operating environment.

The processing at the added functionality module preferably comprises at least one of encrypting, de-duplicating, compressing and caching. The added functionality module is preferably dynamically linked to the point of the compatibility library. A function pointer is preferably utilized to dynamically link the added functionality module to the point of the compatibility library.

Another aspect of the present invention is a method for intercepting I/O requests and responses in a hypervisor utilizing device drivers. The method includes identifying an I/O stream between a hypervisor and a device driver, wherein the I/O stream is an I/O request or an I/O response. The method also includes intercepting the I/O stream at a point of a compatibility library, wherein the point is selected from a point at which a context is established for calling the device driver and a point at which an I/O completion from the device driver is forwarded to the compatibility library. The method also includes transmitting the I/O stream to an added functionality module for processing. The method also includes processing the I/O stream at the added functionality module to create a processed I/O stream. The method also includes transmitting the processed I/O stream to either the device driver or the hypervisor.

Yet another aspect of the present invention is a method for intercepting I/O requests and responses in a proprietary operating environment utilizing device drivers. The method includes identifying an I/O stream between a proprietary environment and a device driver, wherein the I/O stream is an I/O request or an I/O response. The method also includes intercepting the I/O stream at a point of a compatibility library, wherein the point is selected from a point at which a context is established for calling the device driver and a point at which an I/O completion from the device driver is forwarded to the compatibility library. The method also includes transmitting the I/O stream to an added functionality module for processing. The method also includes processing the I/O stream at the added functionality module to create a processed I/O stream. The method also includes transmitting the processed I/O stream to either the device driver or the proprietary operating environment.

Yet another aspect of the present invention is a method for intercepting I/O requests in a proprietary operating environment utilizing device drivers. The method includes identifying an I/O request between a proprietary environment and a device driver. The method also includes intercepting the I/O request at a point of a compatibility library at which a context is established for calling the device driver. The method also includes transmitting the I/O request to an added functionality module for processing. The method also processing the I/O request at the added functionality module to create a processed I/O request. The method also transmitting the processed I/O request to the device driver.

Yet another aspect of the present invention is a method for intercepting I/O requests and responses in a proprietary operating environment utilizing open source software device drivers. The method includes identifying an I/O stream between a proprietary environment and an open source device driver, wherein the I/O stream is an I/O request or an I/O response. The method also includes intercepting the I/O stream at a point of a compatibility library, wherein the point is selected from a point at which a context is established for calling the open source device driver and a point at which an I/O completion from the open source device driver is forwarded to the compatibility library. The method also includes transmitting the I/O stream to an added functionality module for processing. The method also includes processing the I/O stream at the added functionality module to create a processed I/O stream. The method also includes transmitting the processed I/O stream to either the open source device driver or the proprietary operating environment.

Yet another aspect of the present invention is a computer system for virtualization including a proprietary environment, a compatibility library comprising at least one function pointer, an added functionality module, and at least one device driver. An I/O stream between the proprietary environment and the at least one device driver is intercepted at the at least one function pointer of a compatibility library and transmitted to the added functionality module for additional processing.

Yet another aspect of the present invention is computer readable recording medium storing a computer program for a method for intercepting I/O requests and responses in a proprietary operating environment or hypervisor utilizing open source or general public license device drivers. The method includes identifying an I/O stream between a proprietary environment and an device driver, wherein the I/O stream is an I/O request or an I/O response, and wherein the device driver is an open source software device driver or a GPL device driver. The method also includes intercepting the I/O stream at a point of a compatibility library, wherein the point is selected from a point at which a context is established for calling the device driver and a point at which an I/O completion from the device driver is forwarded to the compatibility library. The method also includes transmitting the I/O stream to an added functionality module for processing. The method also includes processing the I/O stream at the added functionality module to create a processed I/O stream. The method also includes transmitting the processed I/O stream to either the device driver or the proprietary operating environment.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
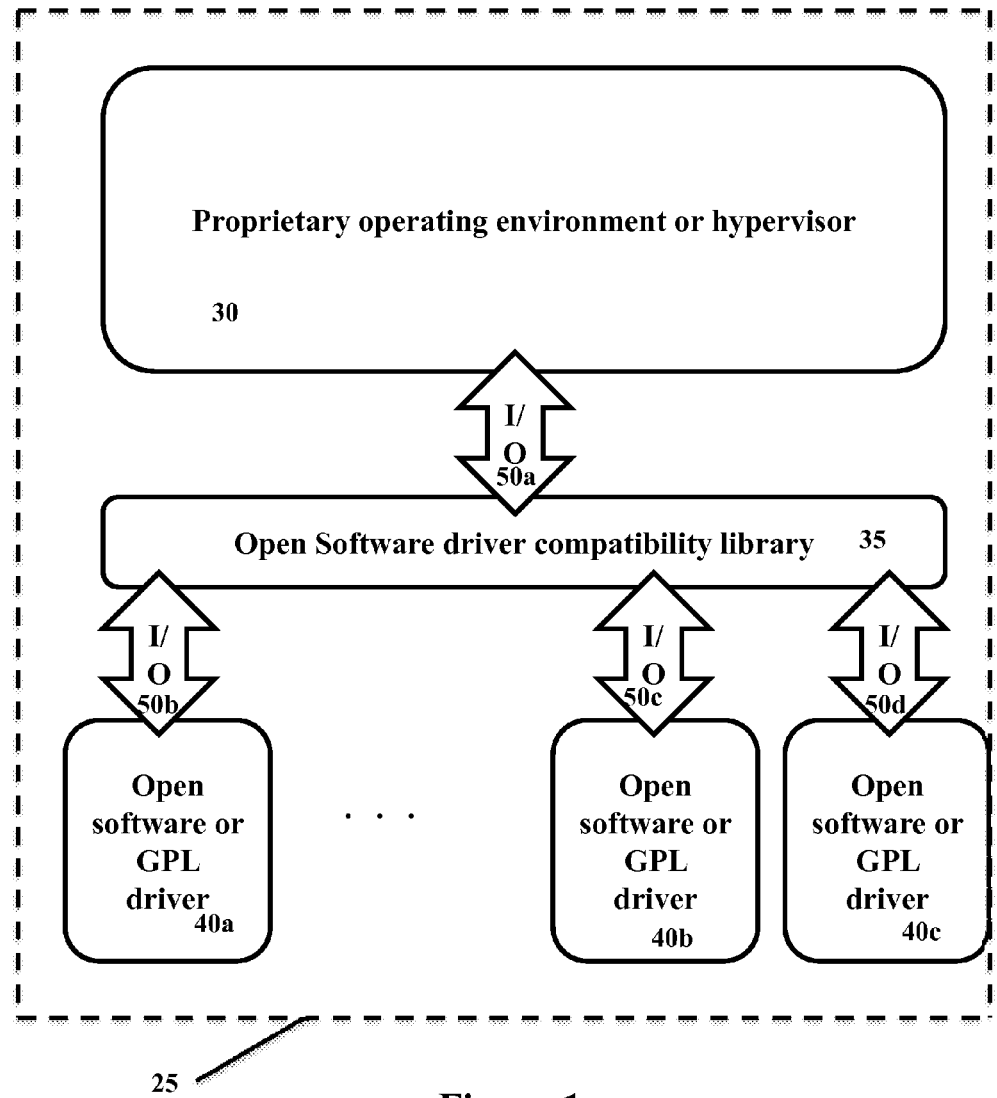
FIG. 1 is a block diagram of a proprietary operating system or hypervisor using a compatibility library to interface with a multitude of open source software or GPL device drivers.

As shown in FIG. 1, a computing system 25 includes a proprietary operating environment or hypervisor 30, an open source software device driver compatibility library 35 and multiple device drivers 40a, 40b and 40c. An I/O stream 50a is transmitted between the environment 30 and compatibility library 35. Subsequent I/O streams 50b, 50c and 50d are transmitted between the compatibility library 35 and device drivers 40a, 40b and 40c.

Figure 2:
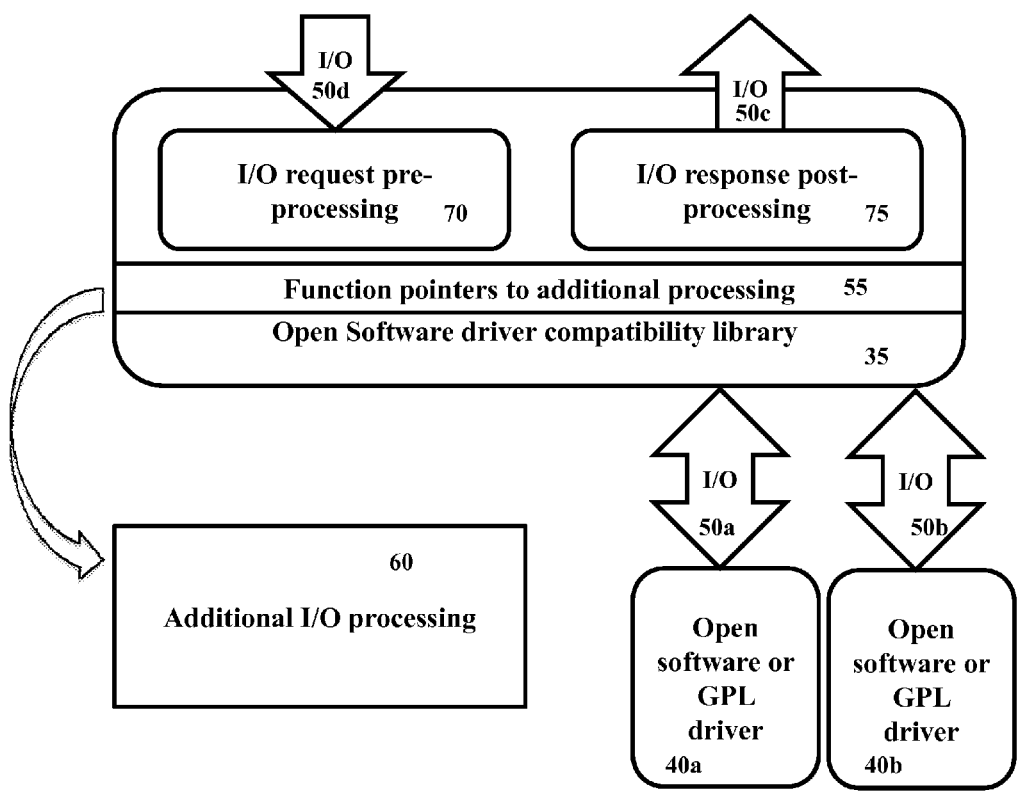
FIG. 2 is a block diagram of an open source software compatibility library showing the addition of function pointers to additional I/O processing function(s), and illustrating function pointers to perform dynamic run time linking at the points of common I/O request pre-processing and I/O response post processing within the compatibility library to intercept all calls to and responses from the open source software or GPL device drivers.

As shown in FIG. 2, in a compatibility library 35, function pointers intercept and transfer an I/O stream to an added functionality module 60 for additional processing. The additional processing is at least one of encrypting, de-duplicating, compressing and caching. Those skilled in the pertinent art will recognize that other additional processing may be performed at the added functionality module 60 without departing from the scope and spirit of the present invention. As shown in FIG. 2, an I/O request for pre-processing 70 is received from a proprietary environment 30 at the compatibility library 35, and an I/O response for post-processing 75 is sent to a proprietary environment 30 from the compatibility library 35. I/O streams 50a and 50b are transmitted between the compatibility library 35 and device drivers 40a and 40b.

Figure 3:
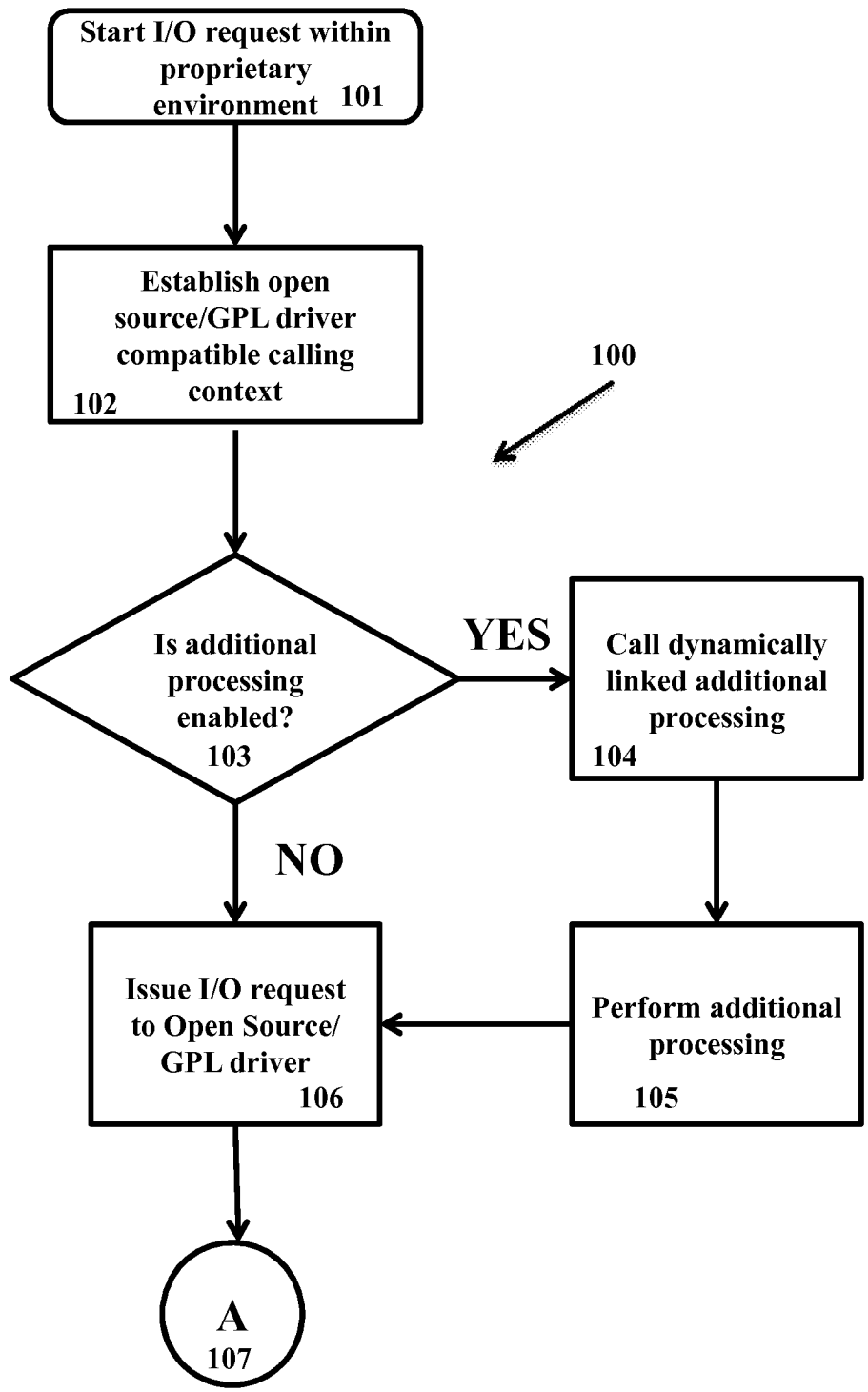
FIG. 3 is a flow chart of a basic I/O request processing.

As shown in FIG. 3, a method for intercepting and processing an I/O request is generally designated 100. The method 100 begins at block 101 with an I/O request 50 within the proprietary environment 30. At block 102, a device driver compatible calling context is established. At decision block 103, an inquiry is made to determine if additional processing is enabled. If the response is YES, then at block 104, a call to a dynamically linked added functionality module 60 for additional processing is made from the point of the compatibility library 35, preferably utilizing a function pointer that provides indirection between the compatibility library 35 and the added functionality module 60. At block 105, additional processing is performed at the added functionality module 60. The additional processing is preferably at least one of encrypting, de-duplicating, compressing and caching. At block 106, an I/O request 50 is issued to the device driver 40. Returning to block 103, if the response is NO, then at block 106 an I/O request 50 is issued to the device driver 40. At circle 107, the device driver 40 receives the I/O request.

Figure 4:
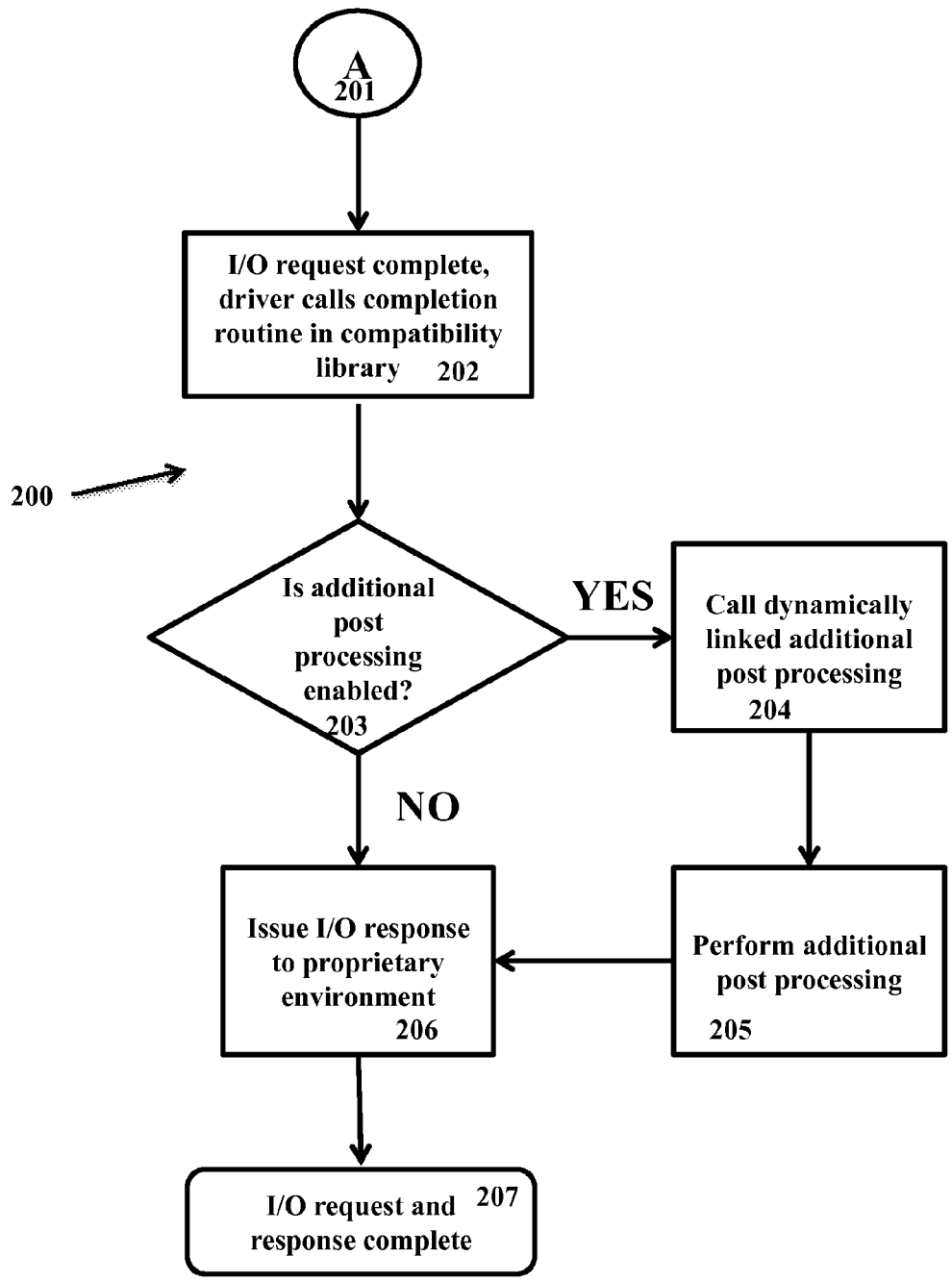
FIG. 4 is a flow chart of a basic I/O response processing.

As shown in FIG. 4, a method for intercepting and processing an I/O response is generally designated 200. The method 200 begins at circle 201 with the device driver 40 transmitting an I/O request complete. At block 202, a device driver 40 initiating an I/O request for completion routine in a compatible library 35 based on the I/O request for completion. At decision block 203, an inquiry is made to determine if post-processing is enabled. If the response is YES, then at block 204, a call to a dynamically linked added functionality module 60 for post-processing is made from the point of the compatibility library 35, preferably utilizing a function pointer that provides indirection between the compatibility library 35 and the added functionality module 60. At block 205, post processing is performed at the added functionality module 60. The post processing is preferably at least one of encrypting, de-duplicating, compressing and caching. At block 206, an I/O response 50 is issued to the proprietary environment 30. Returning to block 203, if the response is NO, then at block 206 an I/O response 50 is issued to the proprietary environment 30. At block 207, the I/O request and response completion message is received at the proprietary environment 30.

Inspection of the published compatibility library code will yield the locations at which all transformations from the proprietary environment to the published interface formats of the open source/GPL device drivers have occurred and the context for calling the open source/GPL device drivers has been established. A simple test added at this point can be made to see whether a call to a dynamically linked added functionality module should be made, passing the same standardized arguments as would be passed to the open source/GPL device driver. Use of a test at this point allows added functionality to be enabled or disabled easily, but is not required. Likewise, inspection of the published compatibility library will yield the point at which I/O completion is forwarded to the proprietary environment. Once again a simple test may be added to optionally call a dynamically linked added functionality module for post processing of the I/O request. The preferred mechanism for implementing such calls to a dynamically linked module is the use of function pointers that provide indirection between the compatibility library and the dynamically linked added functionality module.

The functions in the added functionality module are free to preprocess and post process all I/O requests and responses, and may optionally filter I/O requests and responses by device type or device instance. Furthermore, the added functionality module may satisfy an I/O request without issuing the call to the open source software/GPL device driver.

By dynamically linking the added functionality module with the compatibility module, intellectual property rights may be retained if desired by the independent software producer. By modifying only the published source of the compatibility library, the independent software producer has no reliance cooperation or support by the proprietary software vendor.

The present invention allows for minimal invasiveness. The mechanism requires a minimum of two points to be intercepted in the compatibility library, the point at which the context is established for calling the open source software drivers, and the point at which the I/O completion from the drivers is forwarded back to the compatibility library.

The present invention does not require modification to device drivers. Since all of the open source software and GPL device drivers must communicate with the proprietary system through the compatibility library with a common interface, by intercepting the I/O requests and responses at this interface the device drivers themselves do not have to be modified. As new hardware devices and associated device drivers are produced, they are automatically supported by this mechanism.

The present invention has minimal susceptibility to new versions, updates, and patches of the proprietary environment. All modifications to the proprietary system occur within the compatibility library, which must maintain a fixed interface with the open source software and GPL device drivers and must be dynamically linked. Only new versions, updates, or patches to the compatibility library itself affect this mechanism, and such modifications events are easily detectable by simple checksums or digital signatures.

The present invention relies solely on source code that is required to be published. The preferred implementation requires no reverse engineering or patching of the proprietary system.

The present invention has the ability provide additional I/O stream processing/functionality in a proprietary environment utilizing open source or GPL device drivers without the need to modify the device drivers and without support from the proprietary environment's producer.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for intercepting I/O requests and responses in a proprietary operating environment or hypervisor utilizing open source software or general public license device drivers, the method comprising:

identifying an I/O stream between a closed proprietary operating environment of a computing system and a device driver of the computing system, wherein the I/O stream is an I/O request or an I/O response, and wherein the device driver is an open source device driver or a general public license device driver;

intercepting the I/O stream at a point of a compatibility library of the computing system, wherein the point is selected from a point at which a context is established for calling the device driver and a point at which an I/O completion from the device driver is forwarded to the compatibility library, wherein the compatibility library comprises a published source code;

transmitting the I/O stream to an added functionality module for processing, wherein the added functionality module is dynamically linked to the point of the compatibility library by a function pointer;

processing the I/O stream at the added functionality module to create a processed I/O stream, wherein the processing at the added functionality module comprises at least one of encrypting, de-duplicating and compressing; and transmitting the processed I/O stream to either the device driver or the closed proprietary operating environment.

2. A method for intercepting I/O requests and responses in a proprietary operating environment utilizing open source device drivers, the method comprising:

identifying an I/O stream between a closed proprietary environment of a computing system and an open source device driver of the computing system, wherein the I/O stream is an I/O request or an I/O response;

intercepting the I/O stream at a point of a compatibility library of the computing system, wherein the point is selected from a point at which a context is established for calling the open source device driver and a point at which an I/O completion from the open source device driver is forwarded to the compatibility library;

transmitting the I/O stream to an added functionality module for processing, wherein the added functionality module is dynamically linked to the point of the compatibility library by a function pointer;

processing the I/O stream at the added functionality module to create a processed I/O stream, wherein the processing at the added functionality module comprises at least one of encrypting, de-duplicating and compressing; and transmitting the processed I/O stream to either the open source software device driver or the proprietary operating environment.

* * * * *